US008992670B1

(12) United States Patent
Vohra

(10) Patent No.: US 8,992,670 B1
(45) Date of Patent: Mar. 31, 2015

(54) USE OF GRANULAR ACTIVATED CARBON (GAC) PRODUCED FROM DATE PALM PITS FOR THE REMOVAL OF GAS PHASE VOLATILE ORGANIC COMPOUND (VOC) BENZENE AS A MODEL VOC POLLUTANT FROM CONTINUOUS FLOW GAS STREAMS

(71) Applicants: King Fahd University of Petroleum and Minerals, Dhahran (SA); King Abdulaziz City for Science and Technology, Riyadh (SA)

(72) Inventor: Muhammad Shariq Vohra, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 0 days.

(21) Appl. No.: 14/210,799

(22) Filed: Mar. 14, 2014

(51) Int. Cl.
*B01D 53/02* (2006.01)
*B01D 15/26* (2006.01)

(52) U.S. Cl.
CPC .................................. *B01D 15/265* (2013.01)
USPC .................................. 95/90; 96/108; 502/400

(58) Field of Classification Search
USPC .................................. 95/90; 96/108; 502/400
See application file for complete search history.

(56) References Cited

U.S. PATENT DOCUMENTS

| 4,344,775 A * | 8/1982 | Klein ............................. 95/137 |
| 2011/0229395 A1 * | 9/2011 | Al-Zeghayer et al. ..... 423/245.1 |
| 2012/0279849 A1 * | 11/2012 | Al-Zeghayer et al. ..... 204/158.2 |
| 2013/0004408 A1 * | 1/2013 | Dua et al. .................. 423/445 R |
| 2013/0089738 A1 * | 4/2013 | Al-Zahrani et al. .......... 428/402 |
| 2013/0206688 A1 * | 8/2013 | El-Naas et al. ............... 210/631 |

OTHER PUBLICATIONS

Essa, Mohammed Hussein, et al., "Optimisation of activated carbon production from date pits", 2013, International Journal of Environmental Engineering, 2 pages.

* cited by examiner

*Primary Examiner* — Christopher P Jones
(74) *Attorney, Agent, or Firm* — Oblon, McClelland, Maier & Neustadt, L.L.P.

(57) ABSTRACT

A method for removing one or more volatile organic compounds (VOCs) from a gas stream, in which the method includes adsorbing one or more of the gaseous volatile organic compounds (VOCs) on a granular activated carbon (GAC) obtained from date palm pits. The granular activated carbon is obtained by a process of: cutting the date palm pits into particles; mixing the particles with an acid solution to form soaked date palm pits; transferring the soaked date palm pit particles to stainless steel tubes; heating the tubes inside a muffle furnace; transferring the tubes to a desiccator and cooling; washing the granular activated carbon samples with water and drying; and sieving the samples. The obtained GAC is successfully tested under dynamic continuous gas flow conditions for gas phase benzene removal under a varying set of conditions including different gas phase benzene concentrations.

6 Claims, 4 Drawing Sheets

USE OF GRANULAR ACTIVATED CARBON (GAC) PRODUCED FROM DATE PALM PITS FOR THE REMOVAL OF GAS PHASE VOLATILE ORGANIC COMPOUND (VOC) BENZENE AS A MODEL VOC POLLUTANT FROM CONTINUOUS FLOW GAS STREAMS

BACKGROUND OF THE INVENTION

1. Field of the Disclosure

The present invention relates to a method for controlling air pollution, comprising adsorbing one or more gaseous volatile organic compounds (VOCs) present in air on a granular activated carbon (GAC) obtained from date palm pits.

2. Description of Related Art

Granular activated carbon (GAC) has been used for air pollution control. Also several previous studies report production of activated carbon from date palm pits and other date palm tree byproducts (J. M. Dias, M. C. M. Alvim-Ferraz, M. F. Almeida, J. Rivera-Utrilla, M. Sánchez-Polo, Waste materials for activated carbon preparation and its use in aqueous-phase treatment: A review, J. Environ. Manag. 85 (2007) 833-846; A. A. M. Daifullah, B. S. Girgis, Impact of surface characteristics of activated carbon on adsorption of BTEX, Colloids Surf., A 214 (2003) 181-193; A. Demirbas, Agricultural based activated carbons for the removal of dyes from aqueous solutions: A review, J. Hazard. Mater. 167 (2009) 1-9; Y. A. Alhamed, Adsorption kinetics and performance of packed bed adsorber for phenol removal using activated carbon from dates' stones, J. Hazard. Mater. 170 (2009) 763-770; M. Abdulkarim, F. Abu Al-Rub, Adsorption of lead ions from aqueous solution onto activated carbon and chemically-modified activated carbon prepared from date pits, Adsorpt. Sci. Technol. 22 (2004) 119-134; S. A. Al-Muhtaseb, M. H. El-Naas, S. Abdallah, Removal of aluminum from aqueous solutions by adsorption on date-pit and BDH activated carbons, J. Hazard. Mater. 158 (2008) 300-307; N. S. Awwad, A. A. M. Daifuallah, M. M. S. Ali, Removal of $Pb^{2+}$, $Cd^{2+}$, $Fe^{3+}$, and $Sr^{2+}$ from aqueous solution by selected activated carbons derived from date pits, Solvent Extr. Ion Exch. 26 (2008) 764-782; F. Banat, S. Al-Asheh, L. Al-Makhadmeh, Evaluation of the use of raw and activated date pits as potential adsorbents for dye containing waters, Process Biochem. 39 (2003) 193-202; M. Belhachemi, R. V. R. A. Rios, F. Addoun, J. Silvestre-Albero, A. Sepúlveda-Escribano, F. Rodríguez-Reinoso, Preparation of activated carbon from date pits: Effect of the activation agent and liquid phase oxidation, J. Anal. Appl. Pyrolysis 86 (2009) 168-172; C. Bouchelta, M. S. Medjram, O. Bertrand, J.-P. Bellat, Preparation and characterization of activated carbon from date stones by physical activation with steam, J. Anal. Appl. Pyrolysis 82 (2008) 70-77; M. H. Essa, M. A. Al-Zahrani, Date pits as potential raw materials for the production of active carbons in Saudi Arabia, Int. J. Appl. Environ. Sci. 4 (2009) 47-58; M. H. El-Naas, S. Al-Zuhair, M. A. Alhaija, Reduction of COD in refinery wastewater through adsorption on date-pit activated carbon, J. Hazard. Mater. 173 (2010) 750-757; A. El Nemr, A. Khaled, O. Abdelwahab, A. El-Sikaily, Treatment of wastewater containing toxic chromium using new activated carbon developed from date palm seed, J. Hazard. Mater. 152 (2008) 263-275; B. S. Girgis, A. A. El-Hendawy, Porosity development in activated carbons obtained from date pits under chemical activation with phosphoric acid, Micropor. and Mesopor. Mater. 52 (2002) 105-117; N. M. Haimour, S. Emeish, Utilization of date stones for production of activated carbon using phosphoric acid, Waste Manag. 26 (2006) 651-660; B. H. Hameed., J. M. Salman, A. L. Ahmad, Adsorption isotherm and kinetic modeling of 2,4-D pesticide on activated carbon derived from date stones, J. Hazard. Mater. 163 (2009) 121-126; B. Jibril, O. Houache, R. Al-Maamari, B. Al-Rashidi, Effects of $H_3PO_4$ and KOH in carbonization of lignocellulosic material, J. Anal. Appl. Pyrolysis 83 (2008) 151-156; Z. Merzougui, F. Addoun, Effect of oxidant treatment of date pit activated carbons application to the treatment of waters, Desalination 222 (2008) 394-403; K. Riahi, A. B. Mammou, B. B. Thayer, Date-palm fibers as a potential technology for tertiary domestic wastewater treatment, J. Hazard. Mater. 161 (2009a) 608-613; K. Riahi, B. B. Thayer, A. B. Mammou, A. B. Ammar, M. H. Jaafoura, Bisorption characteristics of phosphates from aqueous solution onto *Phoenix dactylifera* L. date palm fibers, J. of Hazard. Mater. 170 (2009b) 511-519—each incorporated by reference in its entirety). However the application of date palm pits based granular activated carbon (GAC), for air pollution control, has not been reported. The present disclosure establishes successful application of respective GAC material for gas phase benzene pollutant removal as a model gas phase volatile organic compound (VOC).

Benzene and other similar volatile organic compounds (VOCs) are common gas phase pollutants in many waste gas streams. The present disclosure successfully employs the date palm pits based granular activated carbon (GAC) for the removal of gas phase benzene volatile organic compound (VOC) under dynamic continuous gas flow conditions. Countries with large scale date palm fruit farming will benefit by using a local waste material based technology to solve relevant air pollution problems.

BRIEF SUMMARY

An object of the invention is a method for controlling air pollution, comprising adsorbing one or more gaseous volatile organic compounds (VOCs) present in air on a granular activated carbon (GAC) obtained from date palm pits.

In one embodiment of the invention, the granular activated carbon (GAC) is obtained from date palm pits by cutting the date palm pits into particles, mixing the particles with an acid solution, transferring soaked date palm pit particles to stainless steel tubes, keeping the tubes inside a muffle furnace and heating, transferring the tubes to a desiccator and cooling, washing the granular activated carbon samples and drying, and sieving the samples.

In another embodiment, the gaseous volatile organic compound (VOC) present in air is benzene.

In another embodiment of the invention, the adsorption is performed by maintaining a continuous flow of volatile organic compound (VOC) benzene containing gas in a down-flow manner through a column, in which, inside the carbon tube, the granular activated carbon particles are placed at the top of an inert support and an inert cover is placed at the top of a granular activated carbon bed.

DETAILED DESCRIPTION

Figure 1:
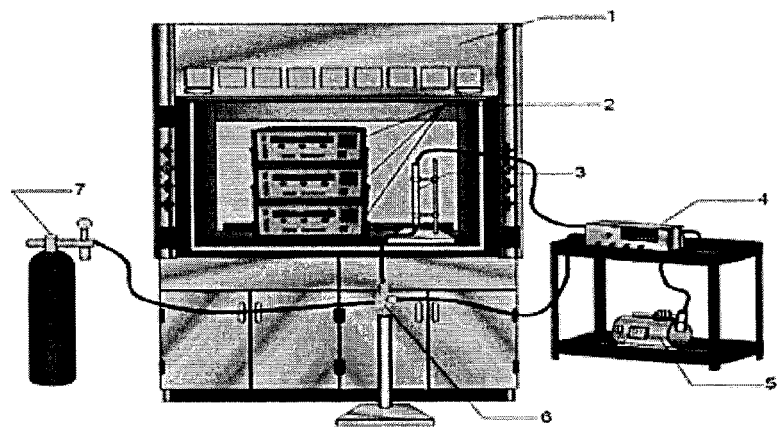
FIG. 1 is a layout of a dynamic continuous gas flow GAC adsorption treatment system for gas phase benzene.

Granular activated carbon (GAC) as used herein refers to carbon in a granular form, which is derived from raw carbonaceous materials, i.e., in the present disclosure date palm pits Granular activated carbon has fast diffusion rates for adsorption of gaseous volatile organic compounds (VOCs).

In the present invention, the granular activated carbon (GAC) is obtained from date palm pits. An example methodology adopted in the present work on how to produce GAC from date palm pits is provided below. The date pits are cut into small particles. An average particle size of the cut date pits is about 1.0 to 1.2 mm, which allows for a larger specific surface area GAC production with higher adsorption capacity, and at the same time least head loss through GAC column during dynamic continuous gas flow air pollution control applications, and consequently lower power cost. Then, the date pit particles are mixed with an acid solution at an impregnation ratio R of 1.6 [R=(volume-acid/weight-date pits)].

The acid solution comprises at least one acid selected from the group consisting of phosphoric acid, sulfuric acid, hydrochloric acid, and nitric acid. The acid solution is preferably a 60% (w/w) phosphoric acid solution.

After mixing, the soaked date pit particles are transferred to tubes. The tubes are composed of stainless steel. The tubes have a diameter of about 25 mm, and have a length of about 300 mm. The tubes have two narrow ports at both ends to expel any gases or vapors, in which the ports have a diameter of 1 mm.

The tubes containing the soaked date pit particles are then kept inside a muffle furnace which is gradually heated at a rate of about 10° C./min, to a temperature of about 500° C. After reaching the desired hold temperature value, the date pits are kept inside the furnace for a hold time of about 2 hours.

After the date pits are kept inside the furnace for the desired hold time, the tubes containing the granular activated carbon are transferred to a desiccator and cooled. Upon cooling, the granular activated carbon is subjected to thorough washing using deionized water until the washings have a pH close to neutral pH range. The washed granular activated carbon is completely drained and dried in an oven at a temperature preferably of 110° C., for 24 hours. Then, the granular activated carbon is sieved to have an average particle size preferably about 1 MM.

The obtained granular activated carbon is effective for adsorbing one or more gaseous volatile organic compounds (VOCs) present in air under dynamic continuous gas flow conditions. An example on the adsorption of gas phase benzene VOC as a model pollutant onto obtained GAC is provided below, but the present disclosure and its application to VOCs air pollution control, is not meant to be limited to the example benzene volatile organic compound. The adsorption is performed using a bench scale dynamic continuous gas flow experimental setup, by passing the VOC containing gas in a continuous flow mode through a down-flow granular activated carbon packed column, wherein the granular activated carbon particles are placed at the top of an inert support inside an FEP tube column. An inert top cover is also placed at the top of the granular activated carbon bed. The granular activated carbon bed depth in the bench scale column setup is preferably from 1 to 6 cm, but the present disclosure and its application to VOCs air pollution control, is not meant to be limited to given bed depths as long as the bed depth is higher than the mass transfer zone length to avoid immediate breakthrough where the break through time ($\tau_{0.05}$) is when the effluent VOC concentration is approximately 5% of influent VOC concentration.

The BET specific surface area of the date palm pits based GAC used in this study is 822 m²/g. This specific surface area value yields very good volatile organic compound benzene gas adsorption initiated removal efficiency.

The gas flow rates as tested in this bench scale study, i.e., 1100 to 2200 mL/min, are not meant to be limited to those values as long as the volatile organic compound's target removal efficiency is achieved, say at higher flow rates, by adjusting the other operational parameters such as the GAC bed depth. A preferable gas volatile organic compound's concentration is up to 23 ppmv, nevertheless higher concentrations could be used at the expense of higher GAC amount usage. Date palm pits derived GAC can be used for a much longer time with a decrease in influent gas concentration as the available adsorption sites on the GAC surface are fixed, a decrease in influent gas concentration results in a higher exhaustion time ($\tau_{0.95}$, when the effluent gas concentration is approximately 95% of influent gas concentration). Hence, GAC produced from date palm pits could be used for a much longer time.

EXAMPLES

The preparation steps of granular activated carbon (GAC) sample from the date palm pits and the characterization of respective GAC is reported in this section. First, the date pits were cut into small pieces. After this step, a 60% (weight/weight) phosphoric acid solution was mixed with the date pit particles at an impregnation ratio R [R=(volume-acid/weight-date pits)] of 1.6. The soaked date pit particles were then transferred to stainless steel tubes of 25 mm diameter and 300 mm length. The tubes have two narrow ports of 1 mm diameter at both ends to expel any gases or vapors. The respective tubes were then kept inside a muffle furnace which was gradually heated at a rate of 10° C./min to 500° C. After reaching the desired hold temperature value, the respective date pits were kept inside the furnace for a 2 h hold time. After that, the respective sample containing tubes were transferred to a desiccator. Upon cooling, the respective GAC sample was subjected to thorough washing using deionized water until the washings showed a pH close to neutral pH value. The washed sample was completely drained and then dried in an oven (Fisher) at 110° C. for 24 h. After this step, the GAC sample was sieved to an average particle size of 1 mm. The specific surface area ($SSA_{BET}$) value for the prepared GAC sample was measured employing the classical BET theory and nitrogen adsorption isotherm data. A physiosorption setup (Micromeritics 2020, USA) was employed to obtain the respective nitrogen adsorption isotherm data. The $SSA_{BET}$ (BET specific surface area) value of GAC produced from date palm pits using chemical activation method using 60% (w/w) $H_3PO_4$ solution, impregnation ratio R=1.6 (volume-acid/weight-date pits), furnace hold temperature T=500° C., and furnace hold time t=2 h, showed a $SSA_{BET}$ value of 822 m²/g.

As mentioned earlier, the application of date palm pits based granular activated carbon (GAC), for air pollution control, has not been reported. Dynamic continuous benzene gas flow column adsorption studies were completed using a down-flow bench scale column setup (FIG. 1). FIG. 1 is a layout of the dynamic continuous gas flow GAC adsorption treatment system for gas phase benzene, which includes a fume hood (1), a benzene gas analyzer (2), influent benzene gas to GAC adsorption column (3), a gas flow meter setup (4), a high purity air supplier (5), effluent gas to gas analyzer (6), and a benzene gas cylinder (7). The GAC tube column details include the following: Naglec Tube #8050-0310; 6.35 mm inner diameter (¼" I.D.)×7.938 mm outer diameter (⁵⁄₁₆" O.D.)×0.794 mm wall thickness (¹⁄₃₂"); FEP tube. The GAC bed depth in the GAC column varied between 1 cm to 6 cm. The benzene gas flow rate varied between 1100 ml/min to 2200 ml/min. The benzene gas concentration was varied between 5.75 ppmv to 23 ppmv. The column had an appropriate inert support at bottom, on top of which the GAC particles were placed. An inert top cover was also placed at top of GAC bed. After this step, the benzene gas from the benzene standard gas cylinder was appropriately diluted using high purity air and then passed through the GAC packed-column (FIG. 1), maintaining a down flow condition at the desired benzene concentration. The gas flow rate was maintained employing high quality gas flow controller (Cole Palmer, U.S.A.). The effluent gas was tested using Thermo Analyzer 55i (Thermo Scientific, U.S.A.). The benzene adsorption breakthrough curve was then established using respective data (for each continuous column adsorption study). These experiments were completed at room temperature.

Figure 2:
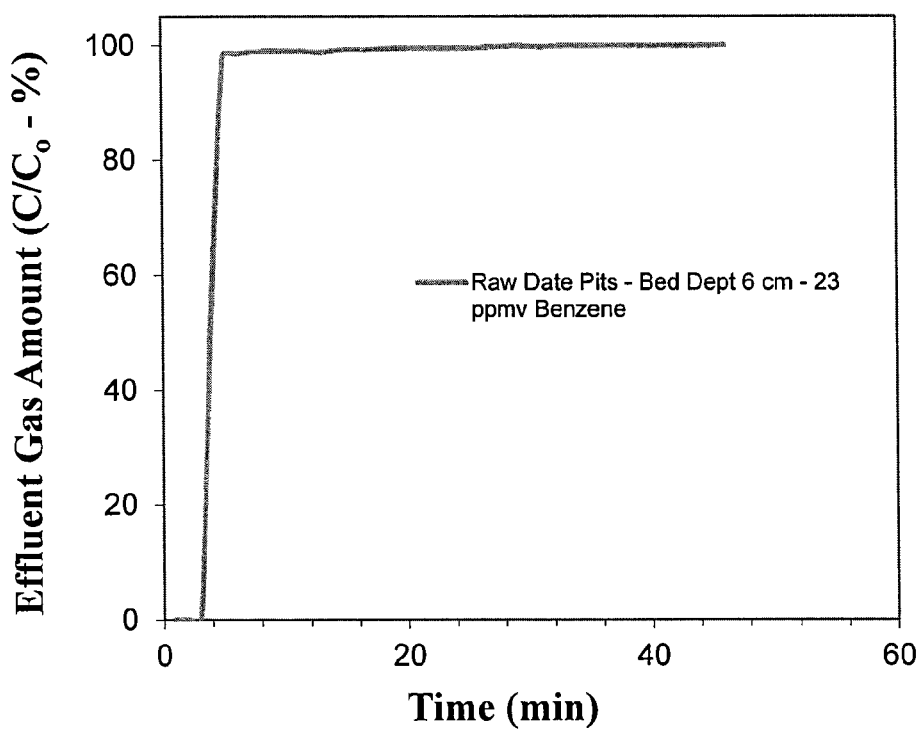
FIG. 2 is an adsorption break through curve obtained from adsorption initiated removal of gas phase benzene using raw date palm pits particles (influent benzene gas concentration 23 ppmv, bed depth 6 cm, bed diameter 6.35 mm, gas flow rate 1100 ml/min).

The adsorption of gas phase benzene onto raw date pits particles (without activation) was studied first. The results are shown in FIG. 2. It is evident that the raw date pit particles have insignificant benzene adsorption capacity. There was near complete exhaustion in approx. 5 min time period, which is insignificant for any real life application.

Figure 3:
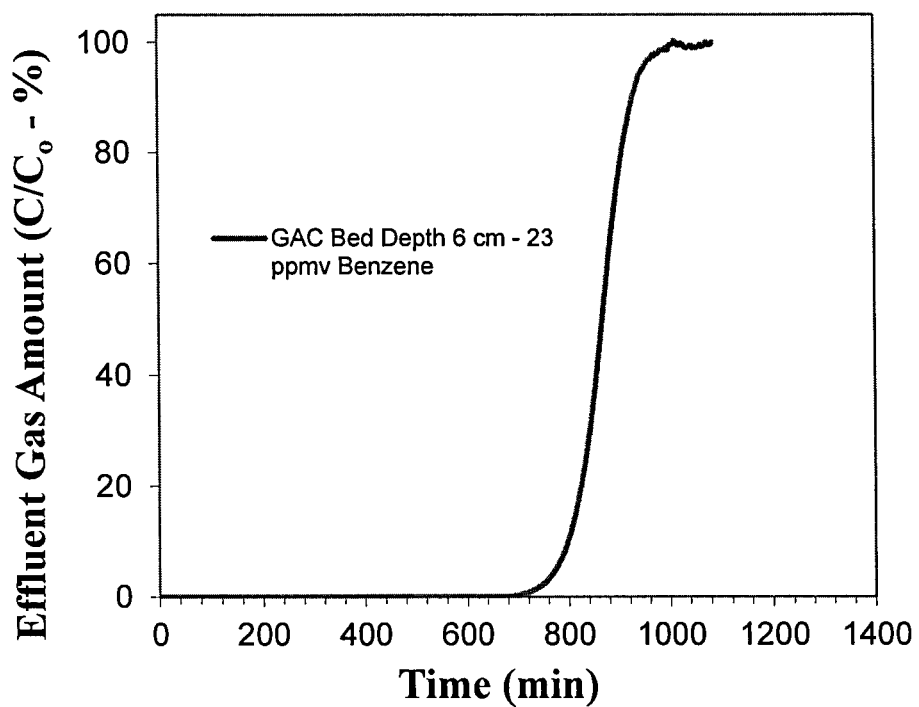
FIG. 3 is an adsorption break through curve obtained from adsorption initiated removal of gas phase benzene using GAC produced from date palm pits particles (influent benzene gas concentration 23 ppmv, GAC bed depth 6 cm, GAC bed diameter 6.35 mm, gas flow rate 1100 ml/min; Date pits based GAC $SSA_{BET}$ 822 m²/g).

On the other hand, FIG. 3 provides gas phase benzene adsorption results using the GAC produced from date palm pits, under the exact same conditions as used for the experimental findings reported in FIG. 2. The respective GAC (used for experimental findings reported in FIG. 3) has a specific surface area ($SSA_{BET}$) of 822 m²/g. Comparing results in FIG. 3 with those given in FIG. 2, a significant increase is noted in benzene adsorption capacity employing the date palm pits based GAC instead of raw date palm pits, respectively. For an influent gas phase benzene concentration of 23 ppmv and GAC bed depth of 6 cm (column I.D. 6.35 mm), the break through (when the effluent benzene concentration is approx. 5% of influent benzene concentration) is noted at about 774 min. Furthermore column exhaustion (when the effluent benzene concentration is approx. 95% of influent benzene concentration) is noted at about 951 min. Date palm pits converted to GAC showed a very high benzene adsorption capacity (FIG. 3) as compared to raw date pits particles (FIG. 2).

Figure 4:
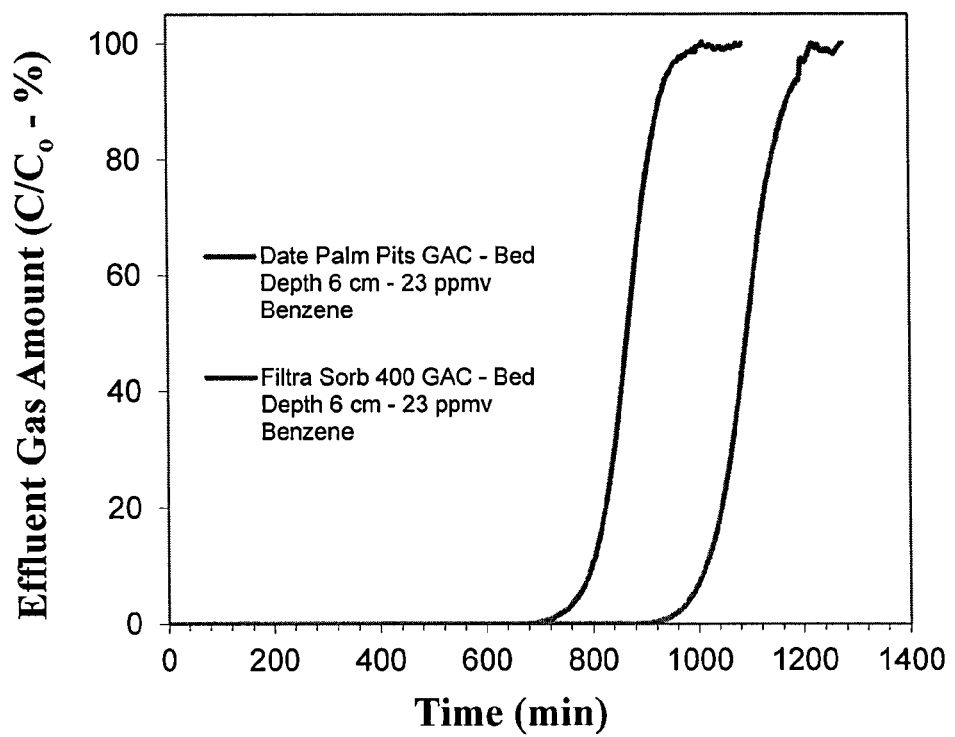
FIG. 4 is a graph showing the effect of GAC type on adsorption break through curve obtained from adsorption initiated removal of gas phase benzene (influent benzene gas concentration 23 ppmv, GAC bed depth 6 cm, GAC bed diameter 6.35 mm, gas flow rate 1100 ml/min; Date pits based GAC $SSA_{BET}$ 822 m²/g; Filtrasorb 400 GAC $SSA_{BET}$ 1100 m²/g).

For comparison purposes, the present disclosure also investigates Filtra Sorb 400 GAC (Calgon U.S.A.) for benzene removal under the same experimental conditions as given in FIG. 3; the respective results are given in FIG. 4. For Filtra Sorb 400 GAC, break through occurs at 988 min and column exhaustion occurs at 1196 min. Though Filtra Sorb 400 GAC shows higher gas phase benzene adsorption capacity compared to palm date pits derived GAC, it is noted that the reported BET specific surface area value for Filtra Sorb 400 is around 1100 m²/g (Y. Al-Degs, M. A. M. Khraisheh, S. J. Allen, M. N. Ahmad, Effect of carbon surface chemistry on the removal of reactive dyes from textile effluent, Wat. Res. 34, (2000) 927-935—incorporated by reference in its entirety) which is higher compared to the present date palm pits based GAC specific surface area value of 822 m²/g. This difference in specific surface area also reflects in respective benzene removal efficiencies. However, date palm pits based GAC still shows very good benzene removal efficiency, as mentioned above.

Figure 5:
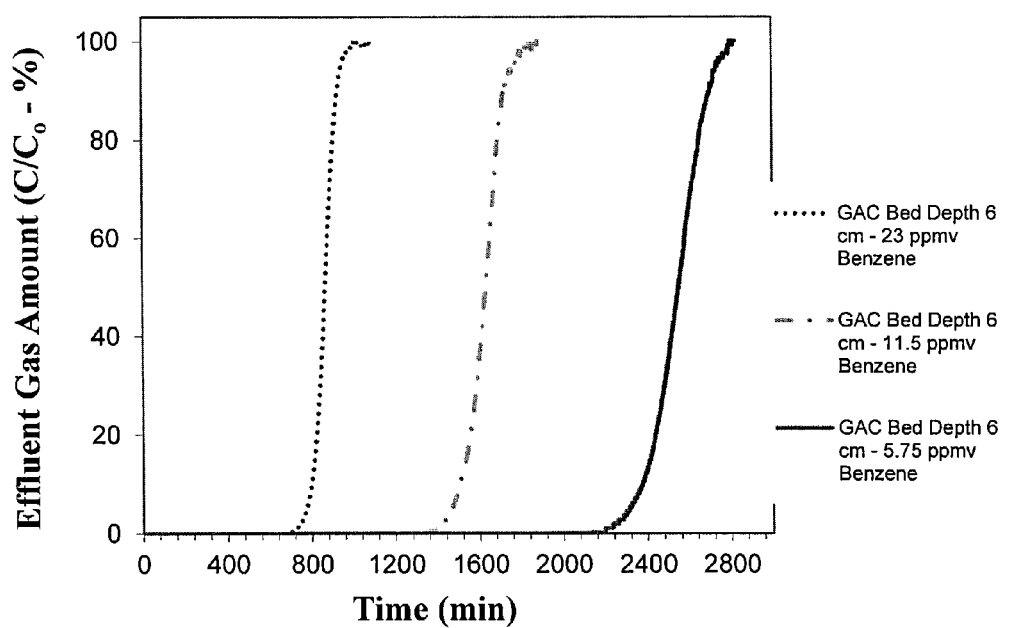
FIG. 5 is a graph showing effect of influent benzene gas concentration on adsorption break through curve obtained from adsorption initiated removal of gas phase benzene using GAC produced from date palm pits particles (GAC bed depth 6 cm, GAC bed diameter 6.35 mm, gas flow rate 1100 ml/min; GAC $SSA_{BET}$ 822 m²/g).

The effect of changing gas phase benzene concentration on to its adsorption on to date palm pits GAC was also compared. The respective results are given in FIG. 5. As the benzene concentration is reduced from 23 ppmv to 11.5 ppmv, the break through time increases from 774 min to 1467 min, respectively. Also the exhaustion time increases from 951 min to 1772 min. A further decrease in benzene concentration to 5.75 ppmv yields the break through time of 2311 min and exhaustion time of 2736 min. These results show that the date palm pits derived GAC can be used for a much longer time with a decrease in influent gas phase benzene concentration.

In summary, the results from the present invention show that granular activated carbon (GAC) produced from date palm pits agricultural waste can be successfully employed to remove gas phase volatile organic compounds and as an example benzene removal results are presented, but present disclosure is not limited to only that volatile organic compound. Countries with large scale date palm fruit farming will definitely benefit by using a local waste material based technology to solve relevant air pollution problems. The respective material can also be exported for business purposes. An otherwise waste material is converted to a very useful product with wide applications for air pollution control purposes. Possible entities, including wastewater treatment plant sites, industrial units dealing with petrochemicals, solid waste handling facilities, etc, which are looking for volatile organic compounds removal from the waste gas streams, will benefit from the present invention.

The invention claimed is:
1. A method for removing one or more volatile organic compounds from a gas stream, comprising
passing the gas stream through a dynamic continuous gas flow treatment system comprising an adsorption column packed with a bed consisting of 1-6 cm of a granular activated carbon obtained from date palm pits with an average particle size of 1.0 to 1.2 mm,
wherein
the granular activated carbon is obtained by a process comprising:
cutting the date palm pits into particles;
mixing the particles with an acid solution to form soaked date palm pits;
removing gas and vapor from the soaked date palm pit particles in stainless steel tubes;
heating the tubes containing the date palm pit particles inside a muffle furnace;
transferring the tubes containing the date palm pit particles to a desiccator and cooling;
washing the desiccated and cooled granular activated carbon with water and drying; and
sieving the washed and cooled granular activated carbon.
2. The method of claim 1, wherein the model gaseous volatile organic compound is benzene.

3. The method of claim 1, wherein the granular activated carbon is located at the top of an inert support and an inert support is also placed at the top of granular activated carbon.

4. The method of claim 1, wherein a BET specific surface area of the date palm pits based granular activated carbon is 822 $m^2/g$.

5. The method of claim 1, wherein the gas stream comprises of volatile organic compound benzene, and concentration of benzene in the gas stream is up to 23 ppmv.

6. The method of claim 1, wherein the method is suitable for controlling air pollution wherein the gas stream contains volatile organic compound.

\* \* \* \* \*